UNITED STATES PATENT OFFICE.

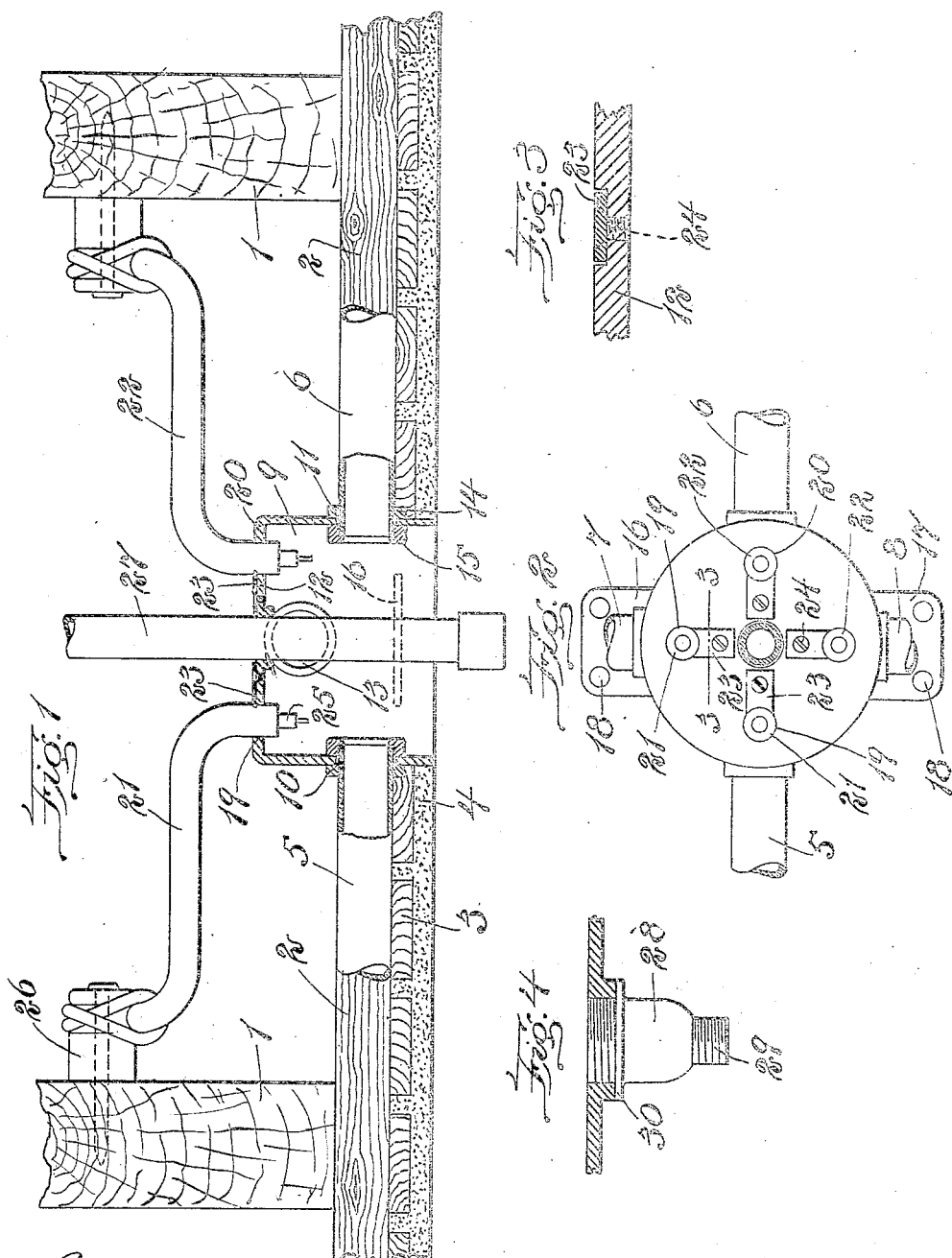

JOHN L. GLEASON, OF BOSTON, MASSACHUSETTS.

UNIVERSAL OUTLET OR JUNCTION BOX.

No. 864,781.    Specification of Letters Patent.    Patented Sept. 3, 1907.

Application filed May 31, 1906. Serial No. 319,472.

*To all whom it may concern:*

Be it known that I, JOHN L. GLEASON, of Boston, in the county of Suffolk and State of Massachusetts, have invented certain new and useful Improvements in Universal Outlet or Junction Boxes, of which the following is a specification.

This invention relates to outlet-boxes used for joining the wires of concealed electrical wiring systems to electric-light and other fixtures.

The rigid conduits of concealed systems for ceiling fixtures are run between or below the floor timbers, and are covered by the lathing and plastering of the ceiling, while the outlet boxes are set entirely within the surface of the ceiling plastering, their open ends usually being flush with the surface. Ordinarily such outlet boxes have been made with four side holes substantially at right angles to each other and in the same plane, for the reception of conduits containing electrical wiring. This has caused a difficulty in connecting conduits at right angles to each other, because it is not possible to run conduits in two rectangular directions in the same plane between the ceiling and floor above or between the walls of two rooms. This is due to the fact that the conduits which run parallel to the floor or wall timbers must be placed above or inside of the strapping or furring, while the transverse conduits must lie below or outside of the edges of the timbers, and in the same plane with the strapping. Consequently when the wires in such conduits have to be joined, it has been previously necessary to offset one or more of the conduits, increasing the labor and making it difficult to fish the wires through the same.

One of the objects of the present invention is to provide a single outlet or junction box which may be used to accommodate electrical conduits passing in different directions and in different planes above the ceiling or within the walls of a room.

Another object of the invention is to provide such an outlet or junction box with openings through which a flexible conductor may be passed, and with provisions for preventing movement of the flexible conduit toward the interior of the box after the same has been put in place.

An outlet box constructed in accordance with my invention is shown in the drawings forming a part of this specification, in which,—

Figure 1 represents a fragmentary sectional view of a ceiling and floor timbers, with part of an electrical wiring system and an outlet box in place. Fig. 2 represents a plan view of the outlet box. Fig. 3 represents a sectional view on line 3—3 of Fig. 2. Fig. 4 represents a stud adapted to be used with the outlet box.

The same reference characters indicate the same parts in all the figures.

Referring to Fig. 1, two of the timbers which support a floor are designated by the numeral 1. Transversely across these timbers are placed light wooden bars 2 which constitute the strapping or furring, and to which the laths 3 are nailed. The laths are transverse to the strapping 2, and therefore parallel to the main timbers 1, and upon their under sides the plaster 4 is spread. The conduits 5 and 6 which extend transversely of the floor timbers must lie below the latter in order to avoid cutting into them, and consequently lie in the same plane as the strapping, while the conduits 7 and 8 extending at right angles to 5 and 6 must be located above the plane of the strapping in order to run clear of the latter. Such a location is perfectly feasible, since these conduits run parallel to the floor timbers and between them. With the old type of junction box in which all of the holes are at the same distance from its end, both transverse and longitudinal conduits cannot be connected without offsetting one of them, and the difficulty with which wires are drawn through an offset, rigid conduit is well understood.

By my invention I provide an outlet box 9 which has a number of ports or narrow openings in its sides, these being arranged in pairs of which the ports 10 and 11 constitute one pair at diametrically opposite points, located near the open end of the junction box and at a considerable distance from the closed end 12 of the box. 13 represents one of the ports constituting the other pair which are arranged at diametrically opposite points and midway between the ports 10 and 11, being located at a greater distance from the open end of the box and nearer the closed end 12 than are the ports 10 and 11. The ports 10 and 11 are located wholly below the plane of the lower edges of the floor timbers, while the port 13 and its opposite are entirely above such plane. Therefore, these ports may be described as respectively on opposite sides of an imaginary plane passing through the outlet box perpendicular to its axis, and parallel to its closed end 12. This arrangement permits the conduits 5 and 7 to be run in directions at right angles to each other, one of them in the plane of the strapping, and the other above such plane, and to be directly connected to the junction box without offsets. The conduits are secured to the box in the ordinary way by a check-nut 14 which abuts against the outside of the box, preventing undue insertion of the conduit, and a conduit bushing 15 on the end of the conduit inside the box.

The box is held in place by ears 16 17 on opposite sides beneath intermediate conduits 10 and 11, and adapted to extend beneath the bars 2 and to be attached thereto by screws or nails passing through holes 18. The lugs are in a line parallel to the axis of port 13, and separated from the latter by a distance slightly greater than the thickness of the bars 2.

In addition to the ports for receiving the rigid conduits, the outlet box also has ports 19 20 for receiving the flexible conduits 21 22 surrounding other conductors. These ports 19 20 are shown in the present construction as being in the end 12 of the box, but they may also equally well be in the sides of the box, if desired. On the outside of the box are retainers 23 for securing the flexible conduits. These retainers consist each of a flat spring which is fastened to the box by a screw or stud 24, and has a yielding end lying close to the periphery of a port 19 or 20, preferably slightly overlapping the edge of the port. The ends of these retainers are recessed on the arc of a circle concentric with the flexible conduit.

The flexible conduits are put in place after the outlet box has been secured. They are slipped outside of the conductors 25 from within the box, and are pushed outward through the ports 19 20, being guided by the conductors which they surround until their outer ends bring up against the insulating knobs 26 to which the conductors are tied. The free ends of the retainers 23 are engaged and displaced by the flexible conduits when the latter are pushed outward, but upon an attempt being made to pull the conduits inward, they engage the ends of their respective retainers, and press them against the box, causing them to bite into the flexible conduits. As the ends of the spring retainers are blunt and the conduits are yielding, the former indent the latter, but without cutting the same, and serve as an effectual lock to prevent the conduits being withdrawn in a direction toward the interior of the box. This is of considerable importance for the reason that the material of which flexible conduits are made is very tough and difficult to cut, so that fixture hangers usually find it more convenient to pull out and throw away the sections of conduit if they are too long, rather than to trim them off to the proper length. This practice is contrary to building and underwriters' requirements, but as the outlets and junctions are concealed after the fixtures are put in place, it is very difficult of detection by inspectors. However, when my retainer is employed, it is impossible for the fixture hanger to remove the flexible conduits.

My outlet box is the only one, so far as I am aware, with which it is feasible to use both rigid and flexible conduits, as hitherto it has been the custom to use entirely different styles of boxes for these two classes of conduits. This made it necessary for dealers and contractors to carry a double set of supplies. By my invention, however, the necessity of carrying a number of different styles of box is avoided.

The box has in its end 12 a central hole through which a gas-pipe 27 may extend in buildings which are equipped with gas pipes, and to which electrical fixtures may be attached. Where there is no piping, the hole may be closed by a stud 28 shown in Fig. 4, which is threaded into the hole, and has a threaded nipple 29 to receive a support and fixture. A collar 30 limits the amount by which the stud 28 is screwed into the end of the outlet box.

I claim:—

1. An outlet box having openings in its side and end walls to receive electrical conduits, a short flat strip of spring metal mounted on the outside of the box with one end near and the other end relatively remote from an opening, and a removable fastening securing the remote end of the strip to the box and normally holding it flat against the wall thereof, the end near the opening having a blunt edge and being recessed on a smooth curve corresponding to the shape of the opening and extending slightly over the edge thereof, whereby this end is sprung outward when a flexible conduit is passed outward through the opening and embraces and indents the conduit, without cutting the same, when an attempt is made to draw it inward.

2. An outlet box having openings in its side and end walls to receive electrical conduits, a short flat strip of spring metal mounted on the outside of the box with one end near and the other end relatively remote from one of said openings, the box wall having a depression or recess in which the strip is contained and which is shaped similarly to the strip, and a removable fastening securing the remote end of the strip to the box and normally holding it flat against the wall thereof, the end near the opening having a blunt edge and being recessed on a smooth curve corresponding to the shape of the opening and extending slightly over the edge thereof, whereby this end is sprung outward when a flexible conduit is passed outward through the opening and embraces and indents the conduit, without cutting the same, when an attempt is made to draw it inward.

In testimony whereof I have affixed my signature, in presence of two witnesses.

JOHN L. GLEASON.

Witnesses:
ARTHUR H. BROWN,
A. C. RATIGAN.